United States Patent [19]

Yamamoto et al.

[11] 4,364,997

[45] Dec. 21, 1982

[54] CLUTCH FACING MATERIAL AND METHOD FOR MANUFACTURING THE SAME

[75] Inventors: Yasunobu Yamamoto, Chiryu; Toshiaki Sakabe, Toyota; Eizi Hamada, Handa, all of Japan

[73] Assignees: Aisin Seiki Kabushiki Kaisha; Aisin Kako Kabushiki Kaisha, both of Japan

[21] Appl. No.: 265,241

[22] Filed: May 19, 1981

[30] Foreign Application Priority Data

May 24, 1980 [JP] Japan ................... 55-69488

[51] Int. Cl.$^3$ ............................... D02G 3/00
[52] U.S. Cl. ...................... 428/372; 188/251 A; 192/107 M; 427/393.6; 428/244; 428/367; 428/402; 428/443; 523/156; 524/15
[58] Field of Search ............... 106/36; 428/244, 323, 428/402, 408, 443, 372, 373, 367, 377; 188/251 A; 192/107 M; 427/393.6; 523/156; 524/15

[56] References Cited

U.S. PATENT DOCUMENTS

| | | | |
|---|---|---|---|
| 2,767,150 | 10/1956 | Harvey | 523/156 |
| 4,111,891 | 9/1978 | Reynolds | 106/36 |
| 4,187,133 | 2/1980 | Yamamoto et al. | 428/443 |
| 4,262,788 | 4/1981 | Yamamoto et al. | 106/36 |

FOREIGN PATENT DOCUMENTS

| | | | |
|---|---|---|---|
| 242558 | 12/1960 | Australia | 523/156 |
| 55-5907 | 1/1980 | Japan | 523/156 |

*Primary Examiner*—James J. Bell
*Attorney, Agent, or Firm*—Finnegan, Henderson, Farabow, Garrett & Dunner

[57] ABSTRACT

A clutch facing material including strings of asbestos to which are applied a mixture of cashew dust resin and graphite which is in turn mixed with cashew dust. The graphite is inseparably contained in the mixture of cashew dust resin and graphite and, in combination with the cashew dust, provides a clutch facing material showing a high frictional coefficient even at high temperatures.

8 Claims, No Drawings

CLUTCH FACING MATERIAL AND METHOD FOR MANUFACTURING THE SAME

The present invention relates to clutch facing materials for power propelled vehicles and methods for manufacturing the same.

In automobile industry, clutch facing materials for clutch mechanisms have conventionally been prepared from asbestos fibers which are wound around cores of fine brass wires and impregnated with additives for improving the frictional properties thereof to form asbestos cords. Such asbestos cords are mixed with a binder solution such as phenolic resin and thereafter subjected to various processes including drying and forming steps. The use of the additives is intended for improving the wear resistant property and adjusting the frictional coefficient. For such additives, graphite or cashew dusts have conventionally been used and they are usually used together since it is preferable to use them together rather than to use either one alone.

Graphite which has black colour and is usually in powder form provides problems in adding the same to the asbestos fibers since the powder is apt to scatter and contaminate the atmosphere. Thus, it has been difficult to add a desired amount of graphite to the asbestos fibers for the purpose of providing an adequate friction resistant property. The inventors have therefore proposed a new additive which unseparably includes the graphite and the cashew dusts for providing a good wear resistant property. The clutch facing material using the proposed additive has been found as having an excellent wear resistant property.

It is therefore an object of the present invention to provide a clutch facing material which is very useful in practice.

Another object of the present invention is to provide a clutch facing material which has an improved wear resistant property as well as a good frictional coefficient.

A further object of the present invention is to provide a method for manufacturing a clutch facing material which shows a high wear resistance as well as a better frictional coefficient under a wide temperature range.

According to the present invention, the above and other objects can be accomplished by a clutch facing material including strings of asbestos, cashew dust resin, cashew dusts and graphite, the graphite being contained in the form of powder of a first additive unseparably containing the graphite and the cashew dust resin, the powder of the first additive being mixed with the cashew dusts and applied to the asbestos strings. Further additives may of course be applied in order to obtain a desired property.

According to the present invention, there is further provided a method for manufacturing a clutch facing material comprising steps of providing powder of a first additive unseparably containing graphite and cashew dust resin, mixing the powder of the first additive with cashew dusts to provide a mixture and applying the mixture to asbestos strings. In applying the mixture to the asbestos fibers, an appropriate binder solution may be used.

Thus, it should be noted that the present invention is characterized by the fact that the first additive unseparably containing the graphite and the cashew dust resin is evenly mixed with cashew dusts before it is applied to the asbestos fibers. The first additive may be prepared in two alternative ways. In the first of the alternatives, cashew nut shell liquid is mixed with formaldehyde and then subjected to a condensation reaction in the presence of a suitable acid or alkali catalyst to form a liquid cashew resin which is thereafter mixed with powder graphite to be evenly mixed therewith. The mixture is then mixed with formaldehyde and an acidic hardener or hexamethylenetetramine, and solidified under a room temperature or under heat if necessary. The solidified mixture is then crushed to provide powder of the first additive. In the alternative method, the liquid cashew resin as obtained by the previously described process is mixed with formaldehyde and an acidic hardener or hexamethylenetetramine, and the mixture is solidified under a room temperature or under a heat if necessary to produce a solid cashew resin which is then crushed to produce cashew dust resin. The cashew dust resin is thereafter mixed with a predetermined amount of graphite powder in a suitable mixer, a suitable coating solution such as novolak being added and the mixture being agitated if necessary under heat. Thus, graphite coated cashew dust resin can be obtained.

The additive thus obtained by either of the two alternative methods includes the cashew dust resin and the graphite which are unseparably united together so that there is no possibility of the graphite being separated from the additive and allowed to scatter. The ratio of the graphite to the cashew dust resin can widely be selected. For example, in accordance with the first one of the alternative processes, the powder graphite content may be 5 through 100 parts, preferably 5 through 60 parts, and most preferably 5 through 41 parts by weight per 100 parts of the liquid cashew resin.

In accordance with the alternative process, with respect to the cashew dust resin of 100 parts by weight, the powder graphite may be 5 through 100 parts, preferably 5 through 60 parts. In this alternative process, the suitable resinous solution such as novolak type phenolic resin which is adapted to be mixed with the powder graphite may be in such an amount that can prevent the powder graphite from being removed from the cashew dust resin when the surface of the cashew dust resin is covered with the powder graphite. Further, in the first process, the solid cashew resin containing graphite may be crushed in each case to a particle size which does not prevent it from being applied to the asbestos strings, the preferable particle size being finer than 350μ (40 mesh). In the alternative process, the solid cashew resin is crashed to a similar size, preferably to a size finer than 350μ (40 mesh). The cashew nut shell liquid for producing the liquid cashew resin is a liquid contained in the shell portions of natural cashew nuts and mainly contains cardanol and cardol.

The powder of the first additive thus obtained is mixed with the cashew dusts to obtain a second additive. The first additive and the cashew dusts should preferably be in the form of fine powders and it is recommended that they be of particle sizes finer than 100 mesh. In preparing the second additive, the cashew dusts may be added 50 through 300 parts by weight to the first additive of 100 parts. The second additive is applied to the asbestos strings by 20 through 50 parts by weight to the overall 100 parts of the asbestos strings.

In forming the clutch facing in accordance with the present invention, use may be made of any known moulding processes such as a resin moulding process, a semi-moulding process and a spiral woven process. For manufacturing a high performance clutch facings such as those for automobiles, it is most suitable to use the spiral woven process.

The spiral woven process herein referred to is used to mean a process in which the asbestos fibers are wound on fine brass wires and applied with the second additive and if necessary with other frictional property improving agents to provide asbestos strings which are then subjected to steps of impregnation of the cement composition drying, winding into loops, forming under heat and pressure, heat and finish processings.

The frictional property improving agents which may be applied in addition to the second additive may include a lubricant, a frictional coefficient improving agent and a wear resistance improving agent. These agents may be added in suitable amounts for obtaining a desired result in respect of the frictional properties. Typical examples of these agents are rubber dusts, carbon fibers and various metallic powders.

Reference 1

In a flask provided with a cooling device and an agitator, 296 parts by weight of cashew nut shell liquid and 97 parts by weight of 37% solution of formalin are charged, and agitated under heat while they are added with 2.1 parts by weight of 20% solution of sodium hydroxide. The mixture is maintained under a temperature of 80° C. for three hours to make the components react together. Then, heating is continued under a reduced pressure of 65 to 70 cm Hg to effect dehydration and the product is taken out when the temperature has reached 75° C. Thus, it is possible to obtain a liquid cashew resin having a viscosity of 1600 centipoise under 25° C.

The liquid cashew resin thus obtained is mixed with powder graphite in ratio of 100 parts by weight of the liquid cashew resin to 1.7 parts by weight of the powder graphite. The mixture is then mixed with 15 parts by weight of paraformaldehyde and 22 parts by weight of benzene sulfonic acid, and agitated, heating the mixture to a temperature of 120° C. After cooling, the solid product thus obtained is crushed to fine powders of particle size finer than 150μ (100 mesh) to obtain the first additive which is then evenly mixed with cashew dusts, more than 93% of the cashew dusts being finer than 100 mesh, in the ratio of 75 parts by weight of the first additive per 100 parts by weight of the cashew dusts to obtain the second additive.

Reference 2

A flask provided with a cooling device and an agitator is charged with 296 parts by weight of cashew nut shell liquid and 65 parts by weight of 37% solution of formalin which are then agitated and heated to a temperature of 80° C. Then, the mixture is added with 2.1 parts by weight of oxalic acid and heated to a reflux temperature to carry out a reaction for two hours. Then, the supernatant liquid (water) is removed and heating is continued under a reduced pressure of 65 to 70 cmHg to carry out the dehydration and concentration. When the temperature of the material reaches 180° C., it is added to 96 parts by weight of methanol to obtain an approximately 70% solution of liquid cashew resin. The liquid cashew resin is mixed with powder graphite and hexamethylenetetramine in the ratio of 100 parts by weight of the liquid cashew resin to 7 parts by weight of the powder graphite and 4.5 parts by weight of the hexamethylenetetramine. The mixture is then agitated and heated to a temperature of 140° C. to carry out reaction until the material solidifies under a room temperature. The material is thereafter taken out of the flask and, after being solidified, it is crushed to a particle size finer than 150μ (100 mesh) to obtain the first additive. The first additive is then evenly mixed with cashew dusts, more than 93% of the cashew dusts being finer than 100 mesh, in the ratio of 75 parts by weight of the first additive to 100 parts by weight of the cashew dusts to obtain the second additive.

Reference 3

The second additive is obtained in the same manner as in the reference 2 except that 28 parts by weight of powder graphite is added after the liquid cashew resin has been formed.

EXAMPLE 1

Asbestos strings are prepared by using cores of brass wires and asbestos fibers applied with the second additive as obtained in the reference 1 and rayon fibers. The asbestos strings are impregnated with a methanol solution of the phenolic resin containing 15% of solids. The asbestos strings are then dried under 80° C. for 12 minutes and wound into loops. Thereafter, the strings are cured by subjecting them to a compression molding step under a temperature of 170° C. and a pressure of 100 kg/cm$^2$ for 3 minutes. The cured strings are then heat treated under a temperature of 150° C. for 12 hours and a clutch facing is obtained by removing over-flow materials along the peripheries. The amount of the second additive is 26 parts by weight with respect to 100 parts by weight of asbestos strings.

EXAMPLE 2

A clutch facing is produced in the same manner as in the example 1 except that the second additive as obtained in the reference 2 is used. The amount of the second additive is the same as that in the example 1.

EXAMPLE 3

A clutch facing is produced in the same manner as in the example 1 except that the second additive as obtained in the reference 3 is used. The amount of the second additive is the same as that in the example 1.

COMPARATIVE EXAMPLE

A clutch facing is produced in the same manner as in the example 1 except that the first additive as obtained in the reference 2 is used in place of the second additive.

The clutch facings thus prepared have been subjected to various tests, the results of which are shown in the table.

| Test pieces | Test items Units | | |
|---|---|---|---|
| | Frictional Coefficient | Wear mm | Rate of Wear $10^{-8}$ mm/kg.m |
| Example 1 | 0.32 | 0.80 | 12.5 |
| Example 2 | 0.30 | 0.65 | 10.2 |
| Example 3 | 0.25 | 0.60 | 9.4 |
| Comparative Example | 0.20 | 0.60 | 9.4 |
| Method for Tests | Dynamometer | | |

The tests have been made under 250° C. and the clutch facings have been respectively subjected to 2000 times of repeated engagements. In the table, it will be noted that the clutch facings in accordance with the present invention show satisfactory frictional coefficient even under a high temperature.

We claim:

1. A clutch facing comprising strings of asbestos having a material applied thereto, said material comprising a first additive consisting essentially of a mixture of solid cashew resin and graphite, and a second additive comprising cashew dust.

2. The clutch facing of claim 1 wherein said material applied to said asbestos strings includes agents for improving the frictional properties of said facing.

3. The clutch facing of claim 1 wherein said first additive is formed from a mixture of liquid cashew resin and graphite, said graphite comprising from 5-100 parts by weight per 100 parts of said liquid cashew resin, said second additive containing said cashew dust comprising of from 50-300 parts by weight to 100 parts of said first additive.

4. The clutch facing of claim 3 wherein said graphite comprises 5-41 parts by weight per 100 parts of said liquid cashew resin and wherein the mixture of said cashew dust and said first additive comprises from 20-50 parts by weight per 100 parts of said asbestos strings.

5. A clutch facing material comprising strings of asbestos having a mixture of materials applied thereto, said mixture comprising a first additive of graphite contained in a cashew dust resin, said graphite being inseparably contained in said first additive, said mixture further containing a second additive comprising cashew dust, said graphite being from 5-100 parts by weight per 100 parts of said cashew dust resin, and said cashew dust being present in from 50-300 parts by weight to 100 parts of said first additive.

6. The clutch facing material of claim 5 wherein said graphite is from 5-60 parts by weight per 100 parts of said cashew dust resin and said mixture is applied to said asbestos strings in the amount of from 20-50 parts by weight per 100 parts of said asbestos strings.

7. A method for manufacturing a clutch facing material comprising the steps of:
    (a) mixing powdered graphite with liquid cashew resin to form a first mixture;
    (b) solidifying said resin, thereby solidifying said first mixture;
    (c) crushing said solidified first mixture to form a powder;
    (d) mixing said powder with cashew dust to form a second mixture; and
    (e) applying said second mixture to asbestos strings.

8. A method of making a clutch facing material comprising the steps of:
    (a) forming a powder of solidified cashew resin;
    (b) mixing said powder with graphite to form a first mixture;
    (c) mixing said first mixture with cashew dust to form a second mixture; and
    (d) applying said second mixture to asbestos strings.

* * * * *